(12) United States Patent
Choi et al.

(10) Patent No.: US 7,575,044 B2
(45) Date of Patent: Aug. 18, 2009

(54) VENTILATING SYSTEM

(75) Inventors: Keun Hyoung Choi, Seoul (KR); Jeong Yong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 11/132,212

(22) Filed: May 19, 2005

(65) Prior Publication Data

US 2006/0199510 A1     Sep. 7, 2006

(30) Foreign Application Priority Data

Feb. 15, 2005     (KR) ...................... 10-2005-0012304

(51) Int. Cl.
*F28F 27/02*     (2006.01)
(52) U.S. Cl. ..................... 165/103; 165/122
(58) Field of Classification Search ................... 165/54, 165/103, 119, 166
See application file for complete search history.

(56) References Cited

U.S. PATENT DOCUMENTS

| | | | | |
|---|---|---|---|---|
| 3,261,397 A * | 7/1966 | Arthur | ................... | 165/122 |
| 3,666,007 A * | 5/1972 | Yoshino et al. | ................ | 96/144 |
| 4,377,201 A * | 3/1983 | Kruse et al. | ................... | 165/76 |
| 4,429,735 A * | 2/1984 | Nomaguchi et al. | ........... | 165/60 |
| 4,563,126 A   | 1/1986 | Kobayashi et al. | | |
| 4,746,266 A   | 5/1988 | Kirchner et al. | | |
| 5,000,253 A * | 3/1991 | Komarnicki | ................. | 165/54 |
| 5,024,263 A * | 6/1991 | Laine et al. | ................. | 165/283 |
| 5,193,610 A * | 3/1993 | Morissette et al. | ............ | 165/54 |
| 5,913,360 A * | 6/1999 | Stark | ........................... | 165/66 |
| 5,943,878 A * | 8/1999 | Smiley III et al. | ............. | 62/407 |
| 6,949,131 B2 * | 9/2005 | Yeung | ....................... | 55/467.1 |
| 2003/0034151 A1 | 2/2003 | Lopatinsky et al. | | |
| 2003/0051861 A1 * | 3/2003 | Yeung | ........................ | 165/54 |
| 2005/0081556 A1 | 4/2005 | Kim et al. | | |

FOREIGN PATENT DOCUMENTS

| | | |
|---|---|---|
| CN | 2559812 | 7/2003 |
| CN | 1442638 | 9/2003 |
| DE | 3035672 | 5/1982 |
| EP | 0261490 | 3/1988 |
| EP | 1132690 | 9/2001 |
| GB | 1216703 | 12/1970 |
| GB | 2095752 | 10/1982 |
| JP | 57 122291 | 7/1982 |
| JP | 58 99626 | 6/1983 |

(Continued)

OTHER PUBLICATIONS

English Language Abstract of KR 10 2004 0102566.

(Continued)

*Primary Examiner*—Allen J Flanigan
(74) *Attorney, Agent, or Firm*—McKenna Long & Aldridge LLP

(57) ABSTRACT

Ventilating system including a case in communication with a room, an air supply passage in the case for drawing outdoor air into the room, an air discharge passage in the case for discharging room air to an outside of the room, and a fan both in the air supply flow passage and the air discharge flow passage in the case, thereby providing a compact, low noise, and low cost ventilating system.

2 Claims, 5 Drawing Sheets

FOREIGN PATENT DOCUMENTS

| | | |
|---|---|---|
| JP | 2003 14272 | 1/2003 |
| KR | 102004 0102566 | 12/2004 |

OTHER PUBLICATIONS

U.S. Appl. No. 10/914,086, filed Aug. 10, 2004.
U.S. Appl. No. 10/972,334, filed Oct. 26, 2004.
English language Abstract of CN 1442638.
English language abstract of JP 58-99626.
English language abstract of JP 57-122291.
English language abstract of GB 1216703.
English language abstract of JP 2003-14272.
English language abstract of EP 1132690.

* cited by examiner

VENTILATING SYSTEM

CROSS-REFERENCE TO RELATED APPLICATION

This application claims the benefit of Korean Application No. P2005-0012304 filed on Feb. 15, 2005, which is hereby incorporated by reference as if fully set forth herein.

BACKGROUND OF THE INVENTION

1. Field of the Invention

The present invention relates to ventilating systems, and more particularly, to a ventilating system for supplying outdoor air to a room or discharging room air to an outside of the room.

2. Discussion of the Related Art

Air in a closed room is involved in reduction of an oxygen content and increase of a carbon dioxide content as time goes-by due to respiration of organisms, leading to impede respiration of the organisms.

Therefore, if many people stay in a small space, such as an office or a car, it is required to replace polluted room air with fresh outdoor air from time to time. In general, the ventilating system is used in this time.

A related art ventilating system is provided with an air supply fan for supplying outdoor air to the room, an air supply flow passage for guiding the outdoor air to a case of the ventilating system, an air discharge fan for discharging room air to an outside of the room, and an air discharge flow passage for guiding room air to the outside of the room.

In general, the air supply fan and the air discharge fan are mounted in the case, leading to a size of the case large. Moreover, the two fans and two flow passages increase a cost of the ventilating system.

Furthermore, the related art ventilating system, using two fans, has a loud noise and high power consumption due to the fans.

SUMMARY OF THE INVENTION

Accordingly, the present invention is directed to a ventilating system that substantially obviates one or more problems due to limitations and disadvantages of the related art.

An object of the present invention is to provide a ventilating system having a small size and a low cost.

Another object of the present invention is to provide a ventilating system having low noise and low power consumption of a fan.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ventilating system includes a case in communication with a room, an air supply passage in the case for drawing outdoor air into the room, an air discharge passage in the case for discharging room air to an outside of the room, and a fan both in the air supply flow passage and the air discharge flow passage in the case.

The fan may draw and discharge air in a circumferential direction.

The ventilating system may further include a motor coupled to the fan with a shaft.

The fan may include one side positioned in the air supply flow passage and the other side positioned in the air discharge flow passage.

The ventilating system may further include a heat exchanger in the case to make the outdoor air and the room air to cross and heat exchange with each other.

The ventilating system may further include a first damper in the air supply flow passage for controlling flow of the outdoor air.

The ventilating system may further include a second damper in the air discharge flow passage for controlling flow of the room air.

The first damper may be mounted between the heat exchanger and the fan.

The second damper may be mounted between the heat exchanger and the fan.

The ventilating system may further include a first bypass in the case for introducing the outdoor air to the fan bypassing the heat exchanger.

The ventilating system may further include a third damper mounted to the first bypass for controlling flow of the outdoor air.

The ventilating system may further include a filter in the air supply flow passage for filtering foreign matters from the outdoor air.

The ventilating system may further include a filter in the first bypass for filtering foreign matters from the outdoor air.

The ventilating system may further include a second bypass in the case for discharging the room air to an outside of the room bypassing the heat exchanger.

The ventilating system may further include a fourth damper in the second bypass for controlling flow of the room air.

The ventilating system may further include an air guide for guiding an air flow, and a stabilizer for preventing the air from flowing in a reverse direction, both provided in the air supply flow passage around the fan.

The ventilating system may further include an air guide for guiding an air flow, and a stabilizer for preventing the air from flowing in a reverse direction, both provided in the air discharge flow passage around the fan.

The air guide has a curved surface for smooth flow of the air.

The ventilating system may further include a first filter in the air supply flow passage for filtering foreign matters from the outdoor air.

The ventilating system may further include a second filter in the first bypass for filtering foreign matters from the outdoor air.

The fan may include blades each having a section of a straight line.

The ventilating system may further include blades of the fan each having a section curved in a direction opposite to the air supply flow passage and the air discharge flow passage, respectively.

In the meantime, in another aspect of the present invention, a ventilating system includes a case in communication with a room, an air supply flow passage in the case for drawing outdoor air and supplying the outdoor air to the room, an air discharge flow passage in the case for drawing room air and discharging the room air to an outside of the room, a first fan in the case for drawing the outdoor air into the case, and discharging to the room, and a second fan in the case coupled to the first fan with the same shaft for drawing the room air into the case and discharging the room air to an outside of the room.

The ventilating system may further include a heat exchanger in the case for making the outdoor air and the room air to cross, and heat exchange with each other.

In another aspect of the present invention, a ventilating system includes a case in communication with a room, an air supply flow passage in the case for drawing outdoor air and supplying the outdoor air to the room, an air discharge flow passage in the case for drawing room air and discharging the room air to an outside of the room, a first fan in the case for drawing the outdoor air into the case, and discharging to the room, a second fan in the case for drawing the room air into the case and discharging the room air to an outside of the room, and a motor between the first fan and the second fan for driving the fan and the second fan at the same time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
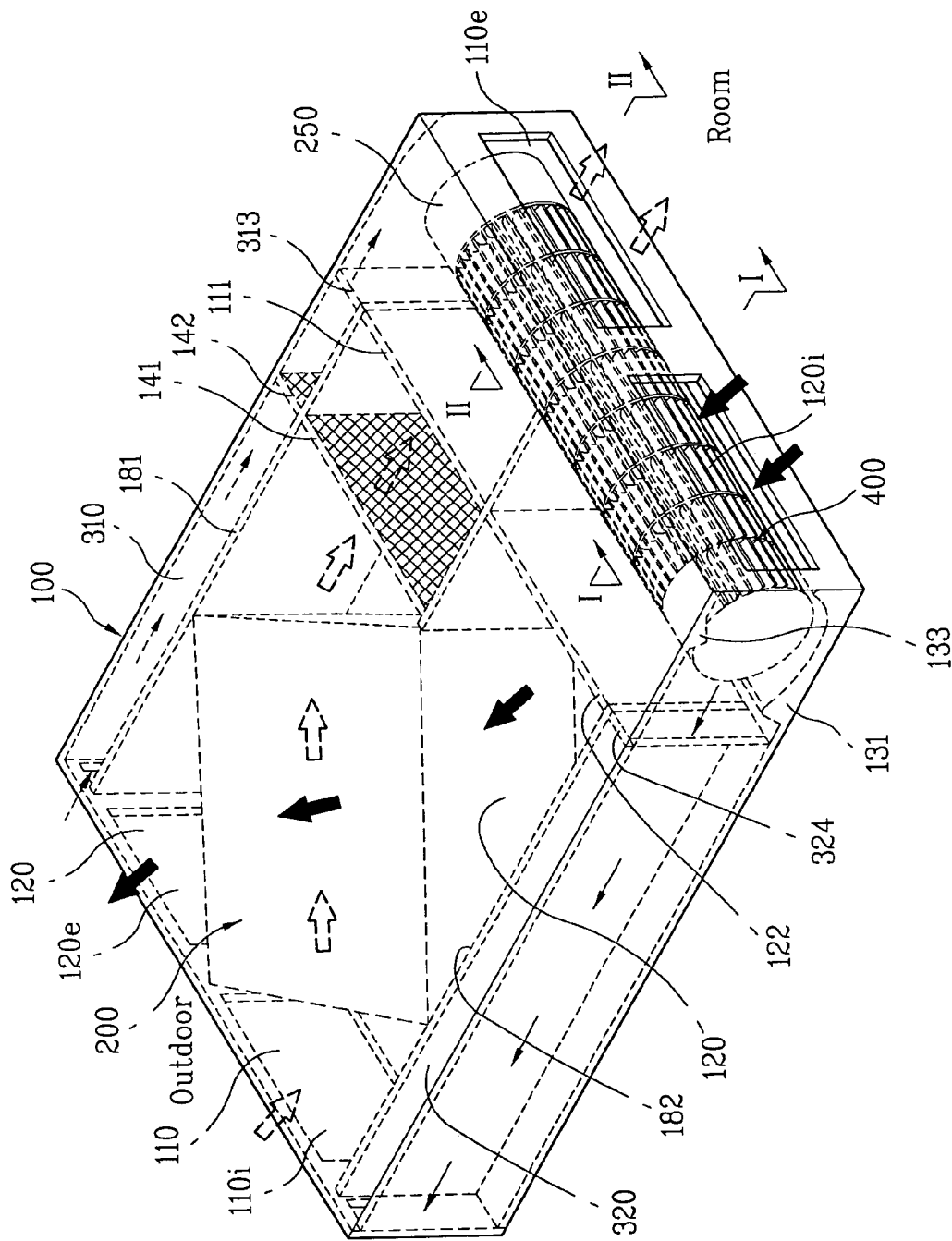
FIG. 1 illustrates a perspective view of a ventilating system in accordance with a first preferred embodiment of the present invention, schematically.

Reference will now be made in detail to the preferred embodiments of the present invention, examples of which are illustrated in the accompanying drawings. Wherever possible, the same reference numbers will be used throughout the drawings to refer to the same or like parts.

FIGS. 1~4 illustrates a ventilating system in accordance with a first preferred embodiment of the present invention, including a case 100 having an air supply flow passage 110 and an air discharge passage 120 formed therein to cross each other.

The air supply flow passage 110 includes a first inlet 110$i$ for drawing outdoor air, a first outlet 110$e$ for discharging the air, and the air discharge flow passage 120 includes a second inlet 120$i$ for drawing room air, and a second outlet 120$e$ for discharging the air to an outside of the room.

In the case 100, there is a fan 400 for drawing outdoor air into the case 100, and discharging the outdoor air to the room, and drawing room air into the case 100, and discharging the room air to an outside of the room.

The fan 400 is mounted both in the air supply air passage 110 and the air discharge flow passage 120. That is, referring to FIG. 1, the fan 400 has one side mounted in the air supply flow passage 110, and the other side mounted in the air discharge flow passage 120.

The fan 400 draws air in a circumferential direction and discharges in a circumferential direction, to have a shape like a sirocco fan. One motor 250 is coupled to a shaft of the fan 400. That is, driving the fan 400 with the motor 250 enables both an air supply mode and an air discharge mode.

Figure 2A:
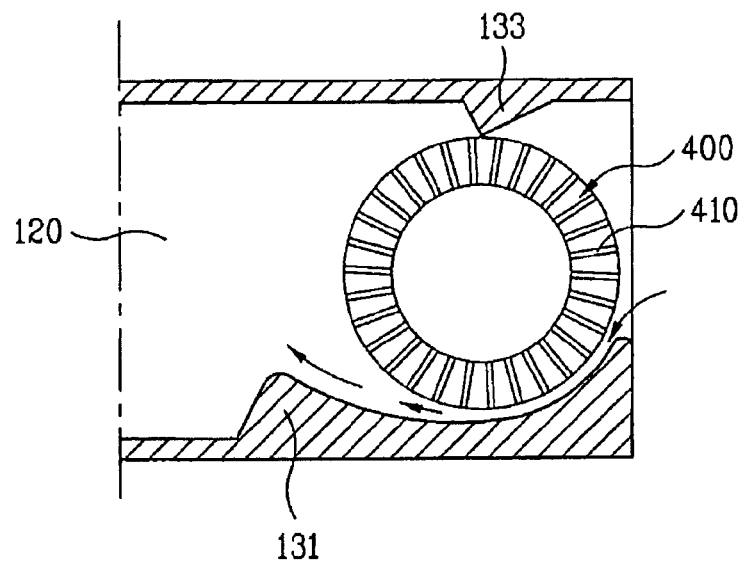
FIG. 2A illustrates a section across a line I-I in FIG. 1.
Figure 2B:
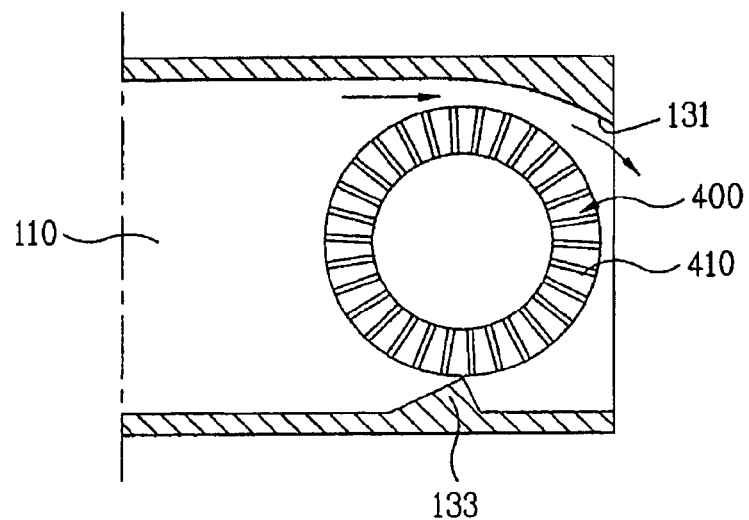
FIG. 2B illustrates a section across a line II-II in FIG. 1.
Figure 3:
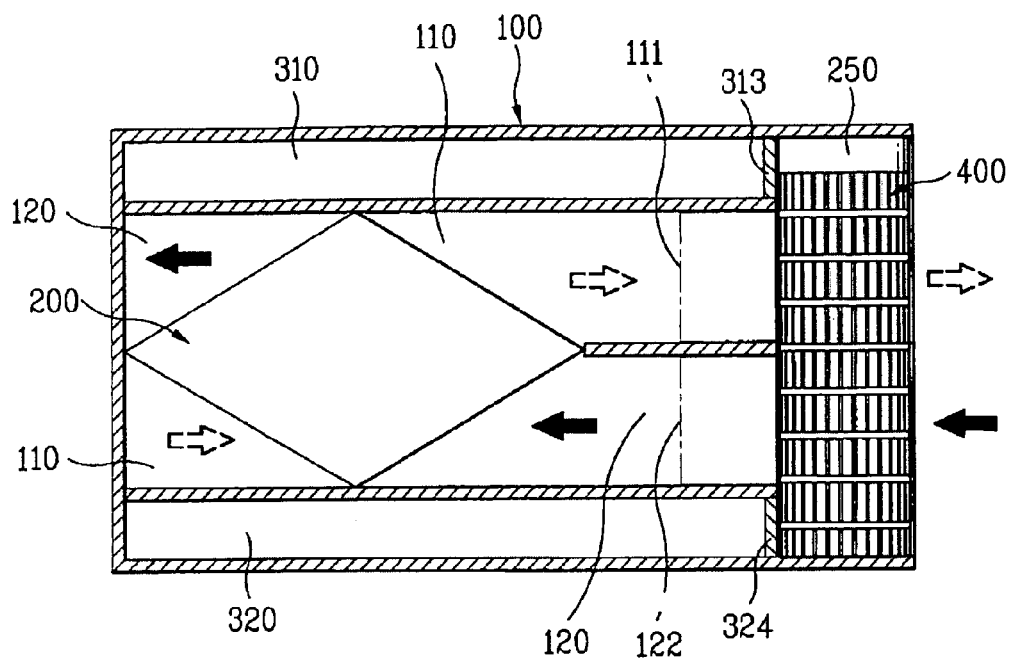
FIG. 3 illustrates a plan view showing an air flow in a heat exchange operation of a ventilating system in accordance with a first preferred embodiment of the present invention, schematically.
Figure 4:
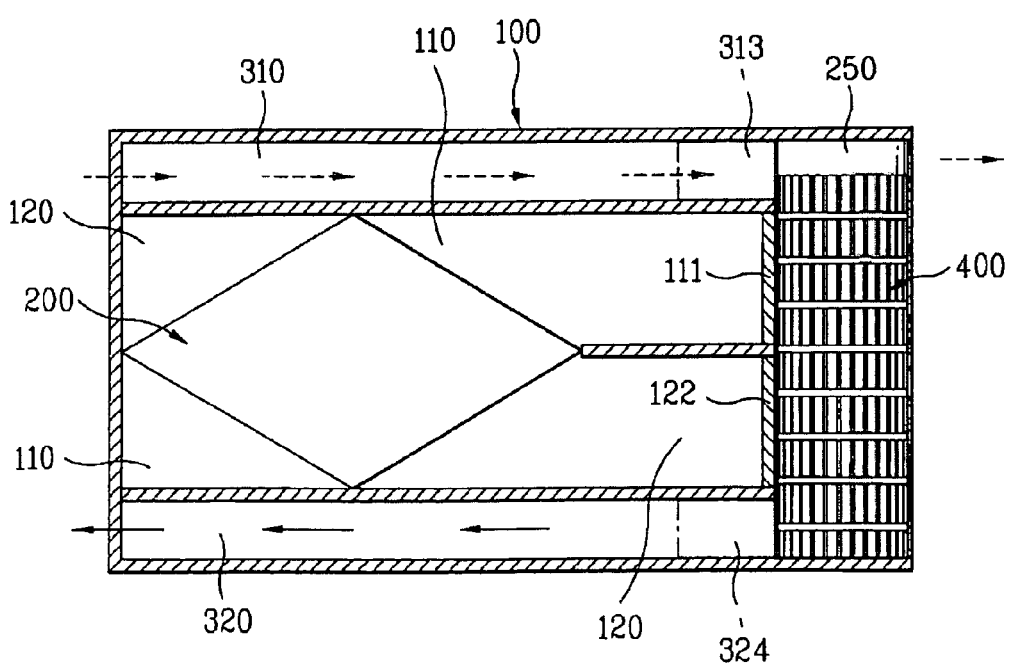
FIG. 4 illustrates a plan view showing an air flow in a bypass operation of a ventilating system in accordance with a first preferred embodiment of the present invention, schematically.
Figure 6A:
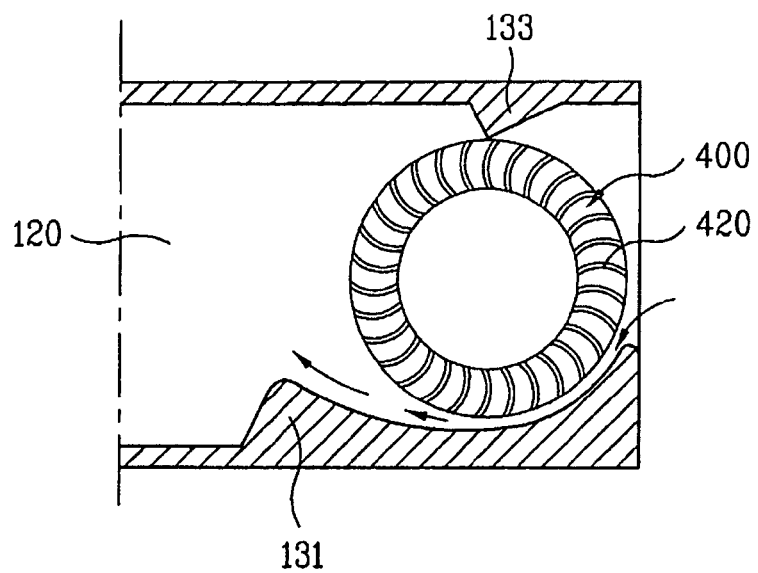
FIGS. 6A and 6B illustrate sections each showing another structure of a fan mounted on the ventilating system of the present invention.
Figure 6B:
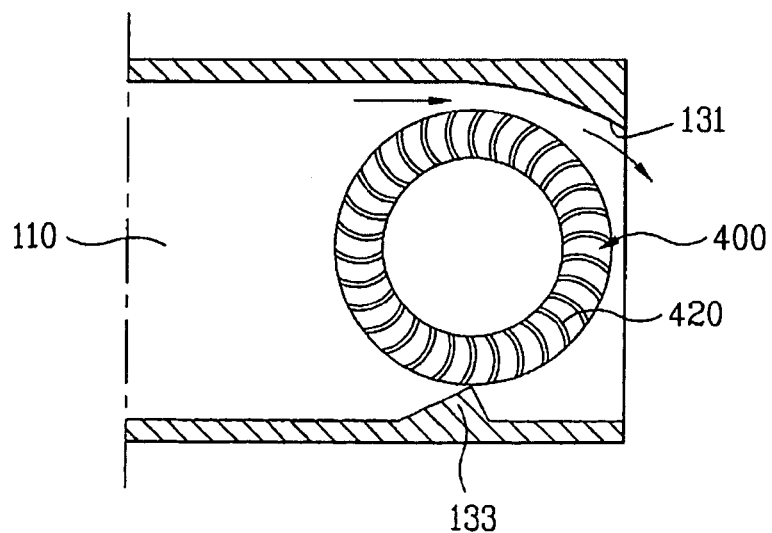

In the meantime, referring to FIGS. 2A and 2B, blades 410 of the fan 400 have straight line sections. The blades 410 may be different shapes. As shown in FIGS. 6A and 6B, the blades 410 may have sections curved in directions opposite to the air supply flow passage 110 and the air discharge flow passages 120.

Of course, in this instance, the direction of the curves of the blades 410 are formed such that air can be drawn from an outside of the room into the case 100 in the case of the air supply mode, and air can be drawn from the room into the case 100 in the case of the air discharge mode.

In the meantime, in the case 100, there is a heat exchanger 200 for making the outdoor air and the room air to cross, and heat exchange, with each other. In more detail, in the case 100, there is a space in which the air supply flow passage 110 and the air discharge flow passage 120 overlap with each other, where the heat exchanger 200 is mounted.

There is a first damper 111 in the air supply flow passage 110 for controlling flow of the outdoor air flowing through the air supply flow passage 110. A likely, there is a second damper 122 in the air discharge flow passage 120 for controlling flow of the air flowing through the air discharge flow passage 120.

That is, by controlling the first damper 111 and the second damper 122, the air supply flow passage 110, and the air discharge flow passage 120 are opened/closed. As shown in FIG. 1, the first damper 111 may be mounted between the heat exchanger 200 and the fan 400, and the second damper 122 may also be mounted between the heat exchanger 200 and the fan 400.

In the meantime, for discharging the outdoor air drawn by the fan 400 to the room directly without passing through the heat exchanger 200, there is a first bypass 310 provided to the case 100. The first bypass 310 is spaced from the air supply flow passage 110, so that the air bypasses the heat exchanger 200 in the case 100.

That is, referring to FIG. 1, there is a first partition wall 181 between the first bypass 310 and the air supply flow passage 110 for separating the first bypass 310 from the air supply flow passage 110. Moreover, there is a first damper 313 mounted to the first bypass 310, for controlling flow of the outdoor air.

In the meantime, there is a first filter 141 in the air supply flow passage 110 for filtering foreign matters from the outdoor air, and there is a second filter 142 in the first bypass 310 for filtering foreign matters from the outdoor air. Both the first filter 141 and the second filter 142 are mounted between the heat exchanger 200 and the fan 400. Though not shown, both the first filter 141 and the second filter 142 may be mounted tilted in the case 100.

There may be a second bypass 320 provided to the case 100 for discharging the room air drawn by the fan 400 to an outside of the room without passing through the heat exchanger 200.

The second bypass 320 is spaced from the air discharge flow passage 120. That is, as shown in FIG. 1, there us a second partition wall 182 between the second bypass 320 and the air discharge flow passage 120, for separating the second bypass 320 from the air discharge flow passage 120.

Moreover, there is a fourth damper 324 in the second bypass 320, for controlling room air flowing through the second bypass 320.

Referring to FIGS. 2A and 2B, both the air supply flow passage 110 and the air discharge flow passage 120 have air guides 131 on one of upper, and lower sides of the fan 400 for guiding flow of the air, respectively.

Moreover, the air supply flow passage 110 and the air discharge flow passage 120 have stabilizers 133 on one of upper and lower sides of the fan 400 opposite to the air guides 131 for preventing the air from flowing in a reverse direction.

The air guides 131 have curved surfaces for smooth flow of air when the air is introduced into the air supply flow passage 110 and the air discharge flow passage 120, respectively.

Both ends of each of the first bypass 310 and the second bypass 320 are opened.

As described before, the ventilating system in accordance with a first preferred embodiment of the present invention is operated in the air supply mode, or in the air discharge mode, which will be described in more detail. At first, a case when the ventilating system is operated in the air supply mode will be described.

The fan 400 is driven in a state the first damper 111 is opened. Then, outdoor air is drawn into the air supply flow passage 110 through the first inlet 110i by a suction force of the fan 400. Then, the air is discharged to the room through the first outlet 110e after passed through the heat exchanger 200 and the first filter 141. When the air passes through the first filter 141, foreign matters are filtered from the outdoor air by the first filter 141. Thus, cleaned outdoor air is supplied to the room through above steps.

Next, a case when the ventilating system is operated in the air discharge mode will be described.

The fan 400 is driven in a state the second damper 122 is opened. Upon putting the fan 400 into operation, the outdoor air is drawn into the case 100 through the second inlet 120i of the air discharge duct 113. Then, the air is discharged to an outside of the room through the second outlet 120e after passed through the heat exchanger 200.

In the meantime, since there is a small temperature difference between the room and the outside of the room, if it is not required for the air to pass through the heat exchanger 200, air is made to flow through the first bypass 310 and the second bypass 320.

For this, both the first damper 111 and the second damper 122 are driven, to close the air supply flow passage 110 and the air discharge flow passage 120, and the fan 400 is driven, so that outdoor air is drawn through the first bypass 310 and discharged to the room through the first outlet 110e, and the room air is drawn into the second bypass 320 through the second inlet 120i, and discharged to an outside of the room through the second outlet 120e. That is, the room air and the outdoor air flow through the case 100 without passing through the heat exchanger 200.

Figure 5:
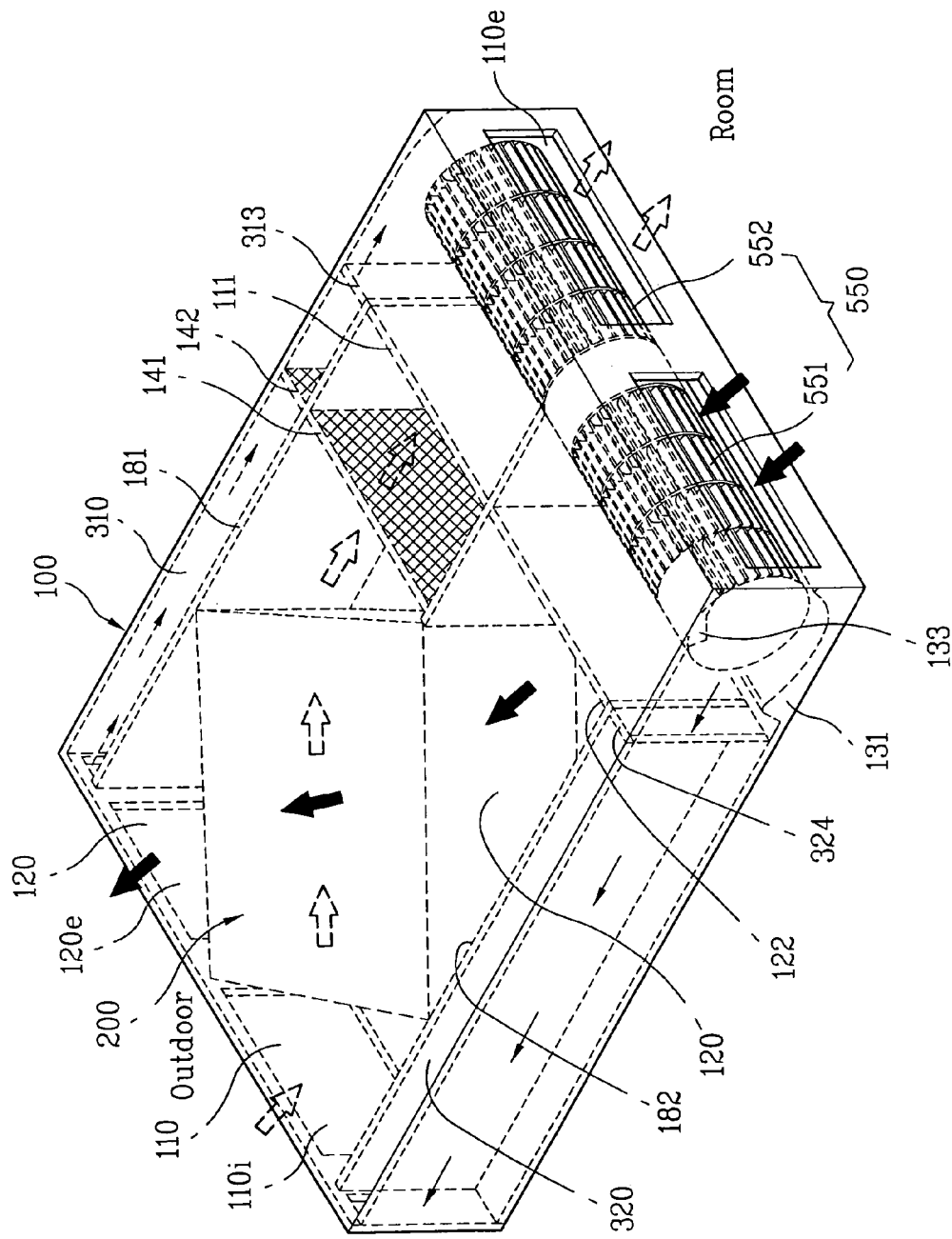
FIG. 5 illustrates a plan view of a ventilating system in accordance with a second preferred embodiment of the present invention, schematically.

FIG. 5 illustrates a plan view of a ventilating system in accordance with a second preferred embodiment of the present invention, schematically. As shown, the ventilating system in accordance with a second preferred embodiment of the present invention is substantially the same with the ventilating system in accordance with a first preferred embodiment of the present invention, except that, while the ventilating system in accordance with a first preferred embodiment of the present invention has a fan 400 crossing the air supply flow passage 110 and the air discharge flow passage 120 at the same time, the ventilating system in accordance with a second preferred embodiment of the present invention has two fans 551 and 552 in the air supply flow passage 110 and the air discharge flow passage 120, respectively.

In the second embodiment, a motor 580 is mounted between the first fan 551 and the second fan 552.

Though not shown, as a variation, a plurality of louvers may be attached to the first inlet 110i, the first outlet 110e, the second inlet 120i, and the second outlet 120e, for opening/closing the inlets 110i and 120i, and outlets 110e, and 120e.

As has been described, the ventilating system of the present invention can introduce outdoor air into the room or discharge room air to an outside of the room by using one fan. The first bypass 310 and the second bypass 320 permit to supply and discharge of air without passing through the heat exchanger according to cases. Accordingly, the present invention can provide a ventilating system that is smaller and of which cost is low.

Moreover, noise and power consumption coming from the fan can be reduced in comparison to the related art ventilating system which has many fans. In addition to this, the filter provided to the ventilating system additionally can perform an air cleaning function. Therefore, air with an appropriate temperature can be supplied to the room even in winter, and a comfortable room environment can be provided by providing cleaned air always.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A ventilating system comprising:
   a case in communication with a room;
   an air supply passage in the case to draw outdoor air into the room;
   an air discharge passage in the case to discharge room air to an outside of the room;
   a fan extending in both the air supply passage and the air discharge passage in the case; a heat exchanger in the case to exchange heat between outdoor air and room air;
   a first bypass in the case to introduce the outdoor air to the fan and to bypass the heat exchanger; and
   a second bypass in the case to discharge the room air to an outside of the room and to bypass the heat exchanger,
   wherein the fan draws and discharges air in a circumferential direction.

2. The ventilating system as claimed in claim 1, further comprising a damper in the second bypass to control flow of the room air.

* * * * *